J. W. YOUNG.
POTATO-DIGGER.

No. 176,572.    Patented April 25, 1876.

WITNESSES:
C. Neveux
John Goethals

INVENTOR:
J. W. Young
BY
Munn
ATTORNEYS.

UNITED STATES PATENT OFFICE.

JAMES W. YOUNG, OF SOUTHFIELD, MICHIGAN.

IMPROVEMENT IN POTATO-DIGGERS.

Specification forming part of Letters Patent No. 176,572, dated April 25, 1876; application filed January 29, 1876.

*To all whom it may concern:*

Figure 1:
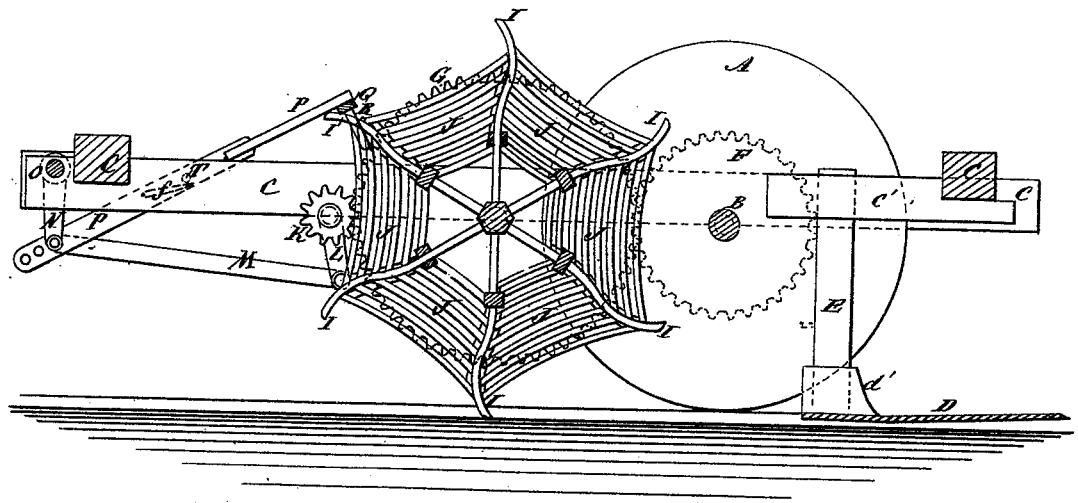
Figure 2:
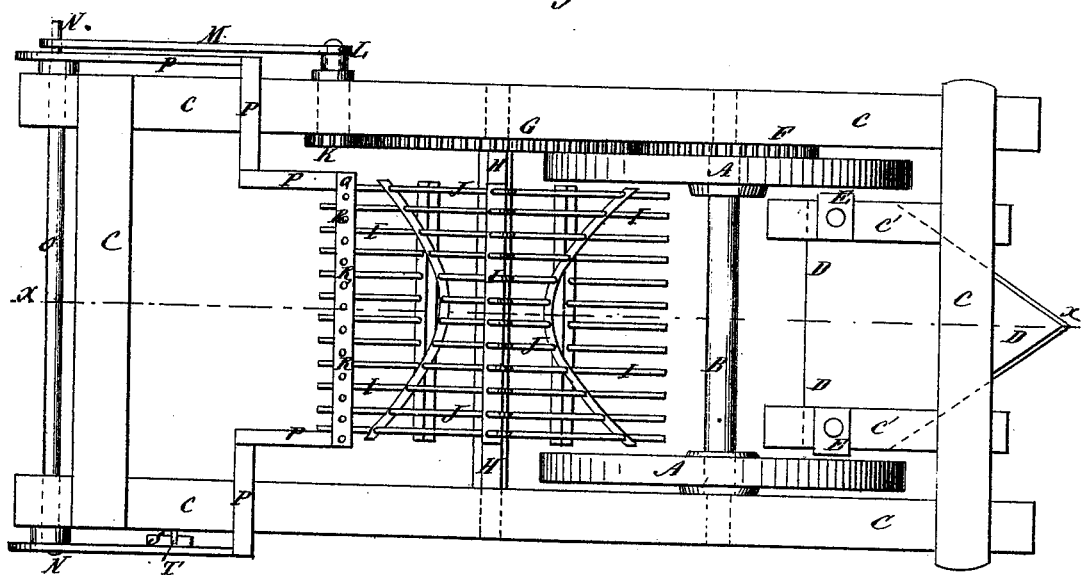

Be it known that I, JAMES W. YOUNG, of Southfield, in the county of Oakland and State of Michigan, have invented a new and useful Improvement in Potato-Diggers, of which the following is a specification:

Figure 1 is a vertical longitudinal section of my improved machine, taken through the line $x\ x$, Fig. 2. Fig. 2 is a top view of the same.

Similar letters of reference indicate corresponding parts.

The object of this invention is to furnish an improved machine for digging potatoes, separating them from the soil, and depositing them in the middle part of the row, so that they will be out of the way of the wheels in digging the next row, and which shall be simple in construction and effective in operation, not only digging the potatoes but also keeping its own teeth free from vines and weeds.

The invention will first be described in connection with the drawing, and then pointed out in the claims.

A are the wheels, which revolve upon the journals of the axle B, which is attached to the forward parts of the side bars of the frame C. The frame C is made long and a little wider than the width of a row of potatoes. D is the shovel, the forward edge of which is made pointed or V-shaped, and which is made with side flanges $d'$ to guide the soil and potatoes inward between the wheels. The shovel D is supported by two arms, E, the lower ends of which are attached to the side parts of the shovel D, and their upper parts are attached to bars $c'$ attached to the frame C. The arms E may pass through mortises in the bars $c'$, and be secured by set-screws, so that the shovel may be conveniently adjusted to work at a greater or less depth in the ground, as may be required. To one of the wheels A is rigidly attached a gear-wheel, F, the teeth of which mesh into the teeth of the larger gear-wheel G, attached to the shaft H. The shaft H revolves in bearings attached to the side bars of the frame C, and to it are attached six, more or less, rows of curved teeth, I, to receive the potatoes and soil from the rear edge of the shovel D, carry the potatoes over the shaft H, and drop them to the ground in the rear of said shaft, the soil in the mean time sifting through the teeth, so that the potatoes may lie upon the top of the ground ready to be conveniently gathered. In the spaces between the rows of teeth I are secured screens J, which are concaved or have their middle parts nearest the shaft H, so as to collect the potatoes at the middle part of the shaft, and cause them to be dropped in the middle part of the row, to keep them out of the way of the wheel when digging the next row.

K is a small gear-wheel, pivoted to the side bar of the frame C, in such a position that its teeth may mesh into the teeth of the gear-wheel G. To the journal of the gear-wheel K, upon the outer side of the side bar of the frame C, is attached a crank, L, to which is pivoted the forward end of the connecting-bar M. The rear end of the connecting-bar M is pivoted to a crank, N, attached to the end of a shaft, O, which revolves in bearings attached to the rear end of the frame C, and has a crank, N, attached to each end.

P are two bars, in the rear ends of which are formed holes to receive the pins of the cranks N. The bars P extend upward and forward, are bent inward at right angles to rest upon the upper sides of the side bars of the frame C, are bent forward at right angles, and to their ends are attached the ends of the bar Q. To the bar Q are attached teeth R at such distances apart as to enter the spaces between the teeth I of the shaft H, to rake off any potato-vines or weeds that may be carried up by said teeth I. To the inner sides of the rear part of the bars P are attached inclined blocks or plates S, which, as the said bars are moving forward, strike against and slide up upon a pin, T, attached to the side bar of the frame C, so as to raise the rake-head Q R, and cause it to pass over the ends of the teeth I, and drop upon the inner parts of said teeth. As the bars P are drawn back the rake-head Q R slides out upon the said teeth I, raking off any vines or weeds that may be upon them. As the bars P move back the incline S passes beneath the pin T, so as to allow the rake-head Q R to rest upon the teeth I.

If desired, the incline S may be attached to the side bar of the frame C, and the pin T to the bar P, the operation being the same in either case.

Having thus described my invention, I claim as new and desire to secure by Letters Patent—

1. The digging, gathering, and sifting wheel, in combination with the horizontal blade, all constructed and arranged as and for the purpose described.

2. The combination, with teeth I, of screens J, concaved in the middle, as and for the purpose set forth.

3. The combination of wheels G K, crank L, connecting-bar M, cranks N, shaft O, and bar P, substantially as and for the purpose specified.

JAMES W. YOUNG.

Witnesses:
GEO. H. LESHER,
L. D. GODFREY.